United States Patent [19]

Vecchio et al.

[11] Patent Number: 5,531,499
[45] Date of Patent: Jul. 2, 1996

[54] COLLAPSIBLE AUTOMOTIVE TRIM PANEL BOSS

[75] Inventors: Michael T. Vecchio, Livonia; Thomas J. Luckett, Westland, both of Mich.

[73] Assignee: Ford Motor Company, Dearborn, Mich.

[21] Appl. No.: 320,351

[22] Filed: Oct. 11, 1994

[51] Int. Cl.$^6$ ...................................................... B60J 5/04
[52] U.S. Cl. ...................... 296/146.7; 296/39.1; 188/377; 24/297; 47/502
[58] Field of Search ................................ 296/146.7, 39.1, 296/189; 188/371, 377; 24/297; 49/502

[56] References Cited

U.S. PATENT DOCUMENTS

| | | | |
|---|---|---|---|
| 4,105,223 | 8/1978 | Oda et al. | 280/752 |
| 4,505,611 | 3/1985 | Nagashima et al. | 24/297 X |
| 4,629,356 | 12/1986 | Hayashi | 403/408.1 |
| 4,739,543 | 4/1988 | Harris, Jr. | 24/297 |
| 4,890,877 | 1/1990 | Ashtiani-Zarandi et al. | 296/153 X |
| 5,039,160 | 8/1991 | Garnweidner et al. | 49/502 X |
| 5,048,234 | 9/1991 | Lau et al. | 49/502 |
| 5,090,755 | 2/1992 | Garnweidner | 293/133 |
| 5,106,223 | 4/1992 | Kraus | 24/293 X |
| 5,169,204 | 12/1992 | Kelman | 296/189 X |
| 5,173,026 | 12/1992 | Cordola et al. | 24/297X |
| 5,290,087 | 3/1994 | Spykerman | 280/751 X |

FOREIGN PATENT DOCUMENTS

| | | | |
|---|---|---|---|
| 3026736 | 2/1982 | Germany | 296/189 |
| 4140706 | 6/1993 | Germany | 280/751 |
| 105741 | 5/1987 | Japan | 24/297 |
| 2-231246 | 9/1990 | Japan . | |
| 5288232 | 11/1993 | Japan | 188/371 |
| 6270670 | 9/1994 | Japan | 296/146.7 |
| 6270673 | 9/1994 | Japan | 296/146.7 |
| 6270675 | 9/1994 | Japan | 296/146.7 |

*Primary Examiner*—Dennis H. Pedder
*Attorney, Agent, or Firm*—David B. Kelley; Roger L. May

[57] ABSTRACT

An automotive door interior assembly has an interior door trim panel with a plurality of bosses extending therefrom having sections of varying wall thickness for allowing energy absorption through columnar deformation of the bosses. The bosses comprise conically shaped, hollow pedestals having a first end attached to the trim panel, a second truncated end opposite the first end, a wall connecting the first end and the second end, and an inner surface on the wall having at least one groove thereon. Connectors on the second truncated end of the bosses attach the trim panel to receiving apertures in the inner door panel.

6 Claims, 3 Drawing Sheets

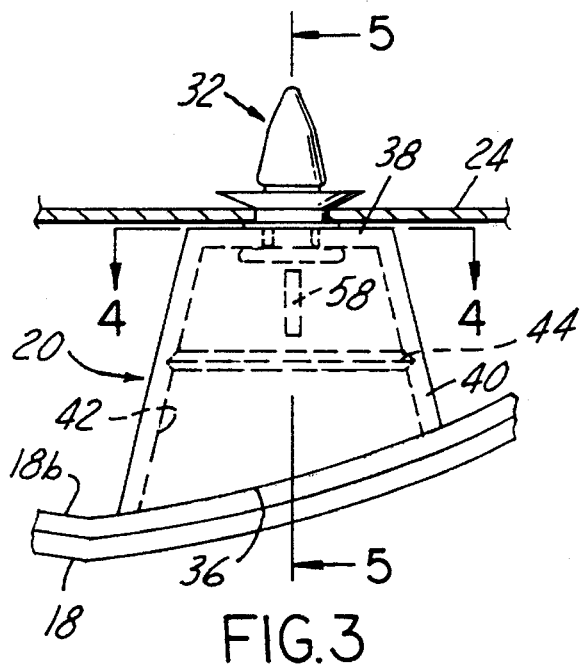
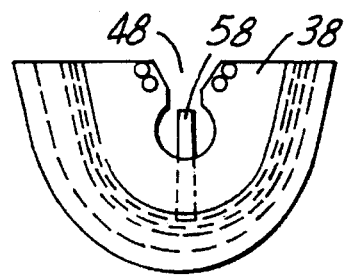
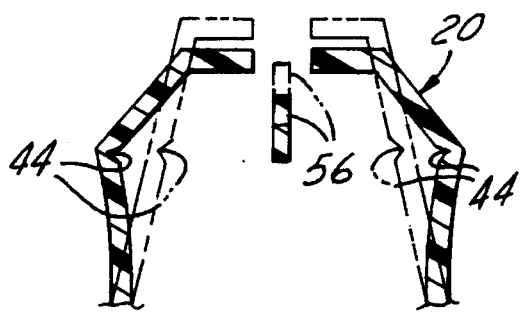
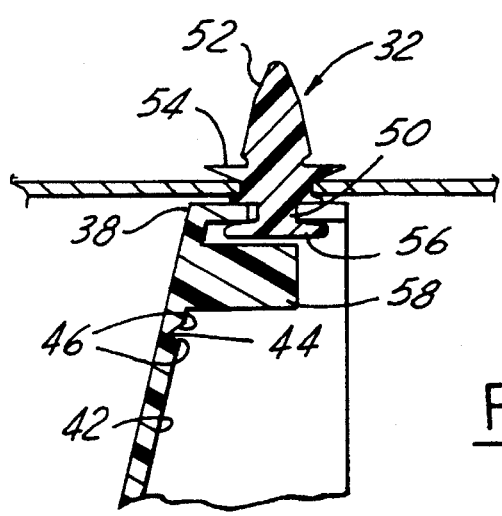
FIG. 3
FIG. 4
FIG. 6
FIG. 5

COLLAPSIBLE AUTOMOTIVE TRIM PANEL BOSS

FIELD OF THE INVENTION

The present invention relates to automotive door trim panel assemblies, and, more particularly, to an energy absorbent, resiliently collapsible, trim panel boss for attaching a vehicle interior trim panel to an inner door panel.

BACKGROUND OF THE INVENTION

Vehicle doors are typically constructed with two or more panels attached to the door frame, including an exterior panel for shielding the passenger compartment from the elements, an inner door panel which provides structural support, and a trim panel facing the passenger compartment. The trim panel is usually fastened to the inner door panel and shields the vehicle occupants from internal door components, such as the window, the window regulator, and the door locks. The trim panel can also provide aesthetic qualities to the interior passenger compartment as well as ergonomic features, for example, easily accessible door handles, mirror and window controls, and the like.

Fastening of the trim panel to the inner door panel is conventionally accomplished by a plurality of trim panel mounted retaining pins which fit through associated openings in the inner door panel. Each retaining pin is secured to a pin receiving bracket, or boss, on the face of the trim panel adjacent the inner door panel. In addition to providing a means for attachment, the retaining pins also can incorporate moisture control devices and energy absorption characteristics.

The energy absorption characteristics of a trim panel play an important role in automotive design from an occupant kinematics standpoint. Several approaches have been taken to integrate energy absorption principles into trim panel designs. For example, foam can be attached to the trim panel to absorb energy from excessive side loading of the vehicle during the impact loading attendant a collision, as is disclosed in U.S. Pat. No. 4,890,877 (Ashtiani-Zarandi et al.). Energy absorption can also be accomplished by mounting spring suspended steel straps between the trim panel and inner door panel, as shown in U.S. Pat. No. 5,048,234 (Lau et al.).

Other devices for energy absorption in a vehicle door provide a shock absorbing feature in the fasteners between the inner door panel and the trim panel. One such device, shown in U.S. Pat. No. 5,169,204 (Kelman), discloses a plurality of fasteners having damping means along the shaft to absorb axial forces. In Japanese Patent 231,246 (Ishikawa), impact force is absorbed by shifting a pin through a core member. These devices rely on compression of a portion of the retaining pin to effect energy absorption, unlike the present invention which relies on collapsing of the retaining pin boss along predetermined sections of varying thickness for energy absorption.

SUMMARY OF THE INVENTION

The present invention provides an automotive door interior assembly comprising, an interior door trim panel, boss means extending from the trim panel and having a plurality of sections of varying wall thickness for allowing energy absorption through columnar deformation of the boss means, retaining means attached to the boss means at an end thereof opposite the trim panel, and an inner door panel having receiving means therein for receiving the retaining means to attach the trim panel to the inner door panel.

The boss means preferably comprises a conically shaped, hollow pedestal having a first end attached to the trim panel, a second truncated end opposite the first end, a wall connecting the first end and the second end, and an inner surface on the wall having at least one V-shaped groove thereon with sides angled between approximately 30° and 60° to the plane of said inner surface defining at least one grooved wall section of reduced thickness and at least two adjacent non-grooved sections of same thickness as the wall so that the at least two adjacent non-grooved sections collapse about the at least one grooved wall section of reduced thickness when the pedestal is columnarly loaded along an axis generally perpendicular to the plane of the trim panel through the pedestal.

In an alternative embodiment, the boss means comprises a plurality of hollow pedestals having a plurality of concentric sections of varying diameter connected by a plurality of reduced width sections such that the plurality of sections concentrically collapse at the plurality of reduced width sections when the pedestal is loaded along an axis generally perpendicular to the plane of the trim panel through the pedestal. The hollow pedestals preferably have a first end with a section of greatest diameter attached to the trim panel, a plurality of sections of continuously decreasing diameter attached to the first end, and a second end with a section of smallest diameter having the retaining means attached thereto. The retaining means comprises a spear-shaped attachment member attached to said second end with a point directed away from said truncated second end for connection with an aperture in the inner door panel.

An object of the present invention is to provide a new and improved trim panel retaining pin boss which has energy absorption characteristics.

Another object is to provide a trim panel with pin type bosses affording interior trim attachment and energy absorption at controlled biomechanically compatible occupant loads in a single boss unit.

An advantage of the present invention is that a trim panel having pin type attachment bosses integrally molded thereon can be made of a high strength material, such as ABS or polypropelene, while still providing adequate side loading energy absorption characteristics.

A feature of the present invention is a trim panel boss having sections of varying thickness constructed so as to allow the boss to controllably and resiliently collapse under a predetermined trim panel load along an axis generally perpendicular to the plane of the trim panel through the boss.

BRIEF DESCRIPTION OF THE DRAWINGS

These and other objects and features of the present invention will be apparent to those skilled in the automotive body arts upon reading the following description with reference to the accompanying drawings, in which like numbers preceded by the figure number refer to like parts throughout the several views and in which:

FIG. 3 is a side view of a collapsible trim panel boss according to a preferred embodiment of the present invention;

FIG. 4 is a top view of the trim panel boss of FIG. 3;

FIG. 5 is a partial cross-sectional view of the trim panel boss of FIG. 3;

FIG. 6 is a cross-sectional view of a preferred embodiment of the present invention showing deformation of the trim panel boss about an interior groove of lesser thickness than the surrounding inner surface;

DETAILED DESCRIPTION OF THE PREFERRED EMBODIMENTS

Figure 1:
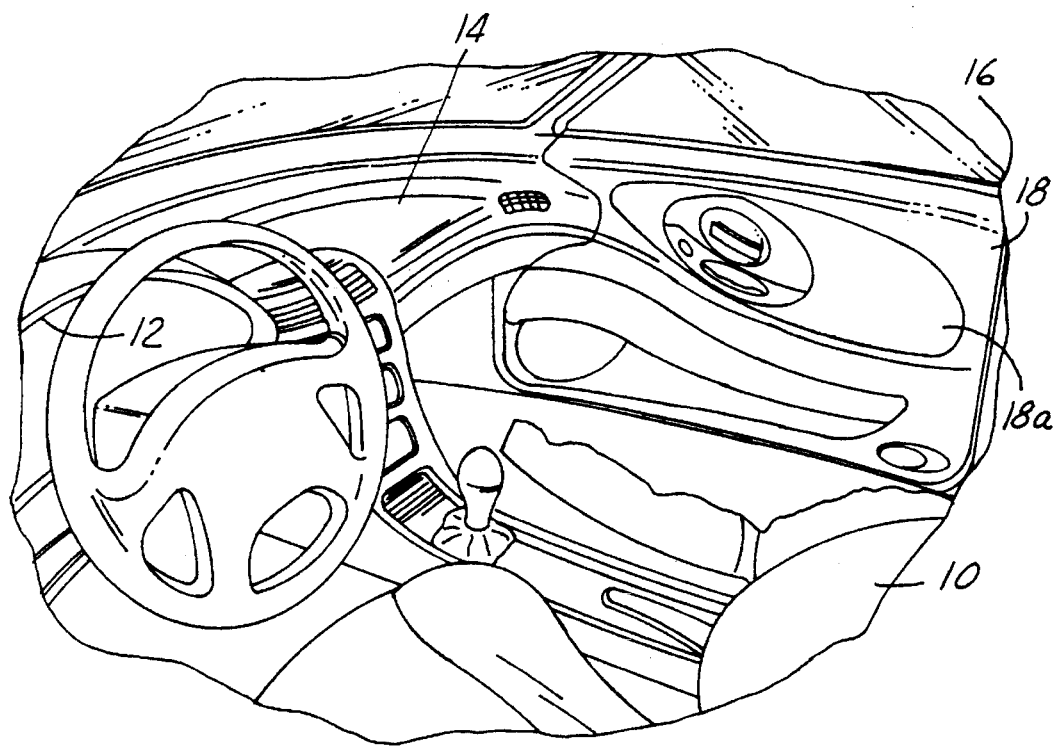
FIG. 1 is an interior view of an automotive vehicle passenger compartment showing a door with a trim panel attached thereto.

Turning now to the drawings and in particular to FIG. 1 thereof, an automotive vehicle passenger compartment 10 is illustrated as bounded in part by instrument panel 12, dashboard 14, and vehicle door 16, which includes interior trim panel 18 facing passenger compartment 10. The interior facing surface 18a of trim panel 18 is appropriately configured for both aesthetic and functional purposes.

Figure 2:
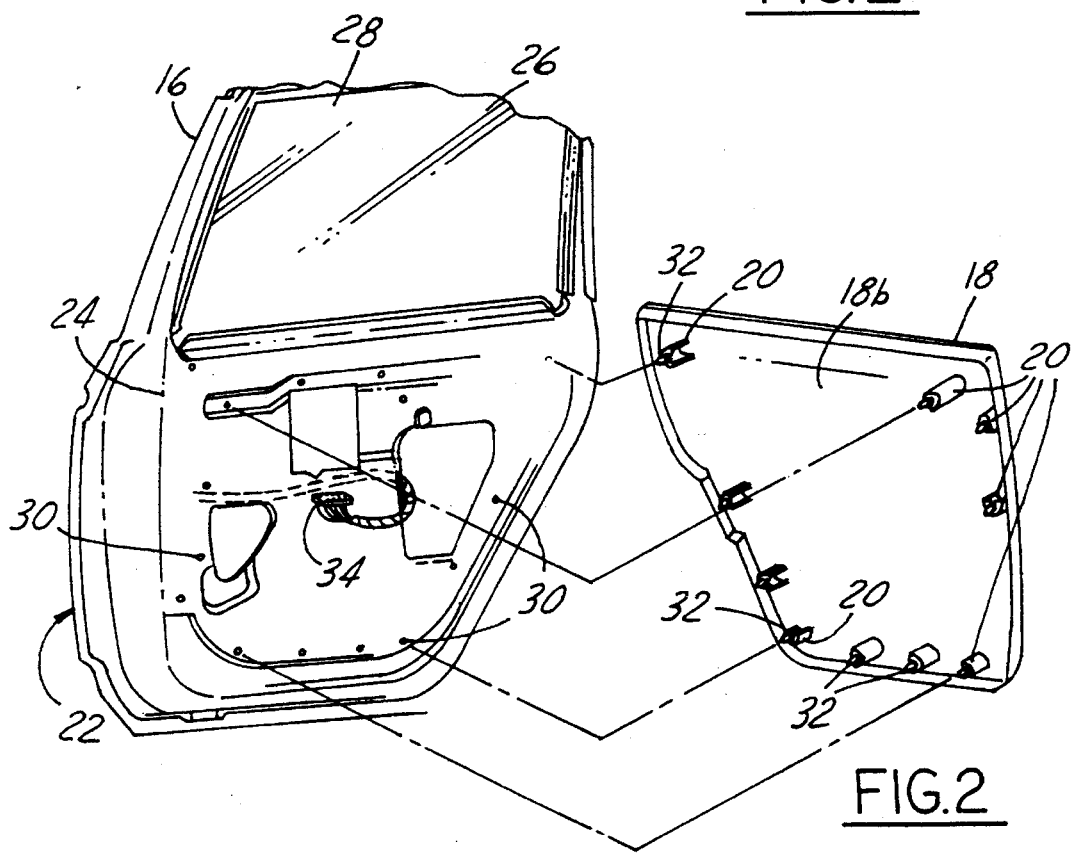
FIG. 2 is a perspective view of the inside of a vehicle door with an inner door panel thereon and a trim panel, spaced from its attached location, including the collapsible bosses according to a preferred embodiment of the present invention.

As may best be seen in FIG. 2, panel 18 has a rear side 18b having energy absorbent bosses 20 attached thereto. The vehicle door 16 also has an outer panel 22, an inner door panel 24, generally secured by welding to outer panel 22, and an aperture 26 for receiving a window 28. The inner trim panel 24 has a plurality of holes 30 which cooperate with connectors 32 and bosses 20 in a one-to-one arrangement for attachment of trim panel 18 thereto. When attached to inner door panel 24, the trim panel 18 covers various door 16 components, including window and lock controls 34 and other components known to those skilled in the art.

Turning now to FIGS. 3–6, a trim panel boss having varying wall thickness for allowing energy absorption through columnar deformation is shown. The boss 20 comprises a hollow pedestal having a first end 36 attached to trim panel 18, a second end 38 opposite first end 36 abutting inner door panel 24, and a wall 40 connecting first end 36 with second end 38. Wall 40 has an inner surface 42 with an annular groove 44 thereon (FIGS. 3 and 5). Preferably, the hollow pedestal is partially cutaway (FIG. 4) and is conically shaped with second end 38 truncated, as shown in FIG. 3.

Groove 44 is situated approximately midway between first end 36 and second end 38 on inner surface 42 and preferably is V-shaped with sides 46 angled between approximately 30° and 60°, and preferably 45°, to the plane of inner surface 42 (FIGS. 3 and 5). It will be understood by those skilled in the art that a plurality of grooves 44 can be molded, cut, or otherwise formed in inner surface 42 to provide a plurality of weakened sections of varying wall 40 thickness for allowing energy absorption through columnar deformation of bosses 20. Such energy absorption is important from an occupant kinematics standpoint to reduce trim panel 18 stiffness when columnarly loaded along an axis generally perpendicular to the plane of trim panel 18.

As best seen in FIG. 4, truncated second end 38 of boss 20 has a keyhole shaped opening 48. Keyhole shaped opening 48 receives a shaft 50 of connector 32 (FIG. 5). Connector 32 serves to retain boss 20 to inner door panel 24. Connector 32 comprises a pushpin which is a generally molded plastic part having a spear shaped attachment member 52, and umbrella portion 54 of wider diameter than spear shaped attachment member 52. Shaft 50 extends axially from spear shaped attachment member 52 and umbrella portion 54 to a disc shaped collar 56 which has a wider diameter than shaft 50 and is attached thereto. Shaft 50 of connector 32 is inserted laterally through keyhole 48 to the position shown in FIG. 5 so as to be in detachable engagement with truncated second end 38.

A flange 58 extends radially inward from inner surface 42 approximate truncated second end 38 to hold disc shaped collar 56 against truncated second end 38. With the plurality of bosses 20 having connectors 32 attached thereto as just described, trim panel 18 is attached to inner door panel 24 by aligning the plurality of bosses 20 with a corresponding plurality of apertures 30 (FIG. 2). Once aligned, trim panel 18 is pressed toward inner door panel 24 so that each spear shaped member 52 is pushed through the corresponding aperture 30 on inner door panel 24. Umbrella shaped member 54 resiliently deforms and also passes through aperture 30 providing a seal therefor. A portion of an automotive door interior assembly configured as just described is shown in FIG. 3.

In response to imposition of sufficient load on trim panel 18, and generally perpendicular thereto, boss 20 will be deformed in columnar fashion as depicted in FIG. 6 around groove 44. Groove 44 provides a weakened section in wall 40 of boss 20 so that the deformation in FIG. 6 results upon sufficient loading.

Boss 20 is preferably integrally formed with an inner section of trim panel 18 and made of a durable, high heat-resistant material, such as ABS or polypropylene, or other materials known to those skilled in the art and suggested by this disclosure. A trim panel 18 according to the present invention will allow door 16 to meet Government side impact requirement requirements without necessitating the use of a softer plastic material for trim panel 18.

Figure 7:
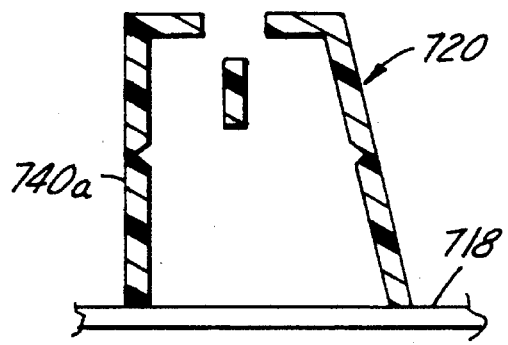
FIG. 7 is a cross-sectional view of an alternative embodiment of the collapsible trim panel boss of the present invention showing a wall of the boss at a 90° orientation.
Figure 8:
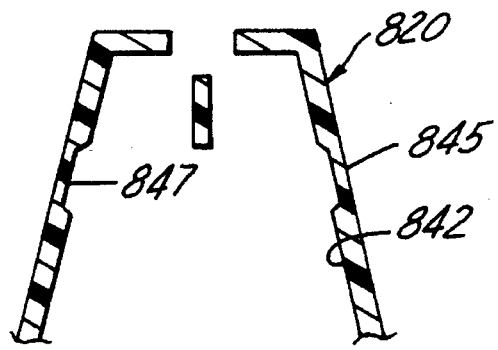
FIG. 8 is a cross-sectional view of an alternative embodiment of the collapsible trim panel boss of the present invention showing an interior groove having sides connected by a planar section approximately parallel with the inner surface of the trim panel boss.

Alternate embodiments for boss 20 are shown in FIGS. 7 and 8. In FIG. 7, boss 720 is semi-conically shaped with wall 740a being perpendicular to trim panel 718. In FIG. 8, boss 820 is conically shaped and has a weakened section 845 on inner surface 842. Weakened section 845 is preferably formed as a groove having chamfered sides angled at approximately 45° to the plane of inner surface of 842, with a planar section 847 therebetween parallel to inner surface 842.

Figure 9:
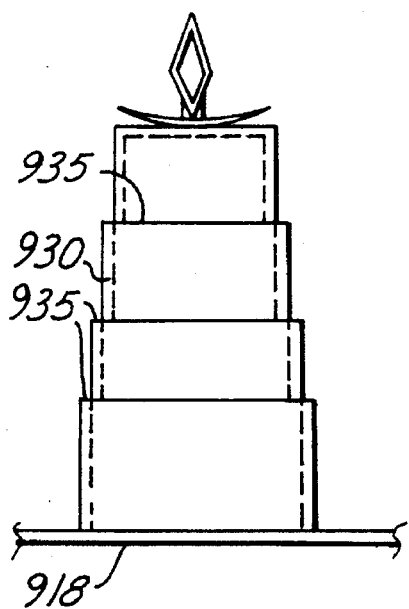
FIG. 9 is a side view of an alternative embodiment of the present invention showing a trim panel boss with telescoping, concentric, collapsible sections.

In the embodiment of FIG. 9, boss 920 is a hollow pedestal having a plurality of telescoping, concentric sections 930 of varying diameter. Sections 930 are connected by a plurality of reduced width sections 935, such that sections 930 concentrically collapse at the reduced width sections 935 when a boss 920 is loaded along an axis generally perpendicular to the plane of trim panel 918.

Although the preferred embodiment of the present invention has been disclosed, various changes and modifications may be made without departing from the scope of the invention as set forth in the appended claims.

We claim:

1. An automotive door interior assembly comprising:

an interior door trim panel;

boss means extending from said trim panel and having a plurality of sections of varying wall thickness for allowing energy absorption through columnar deformation of said boss means, and said boss means comprising a conically shaped hollow pedestal having:

a first end attached to said trim panel;

a truncated second end opposite said first end;

a wall connecting said first end and said second end; and an inner surface on said wall having at least one groove thereon with V-shaped sides angled between approximately 30 degrees and 60 degrees to a plane defined by said inner surface, said at least one groove defining at least one grooved wall section of reduced thickness and at least two adjacent non-grooved sections of same thickness as said wall so that said at least two adjacent non-grooved sections collapse about said at least one grooved wall section of reduced thickness when said pedestal is columnarly loaded along an axis generally perpendicular to a plane defined by said trim panel through said pedestal;

retaining means attached to said truncated second end; and an inner door panel having receiving means therein for receiving said retaining means to attach said trim panel to said inner door panel.

2. An automotive door interior assembly as defined in claim 1 wherein said retaining means comprises:

a spear-shaped attachment member;

a shaft extending axially from said spear-shaped attachment member and having a width smaller than the width of said spear-shaped attachment member; and a collar member attached to said shaft and having a width wider than said shaft.

3. An automotive door interior assembly as defined in claim 2 wherein said wall of said pedestal is partially cut-away.

4. An automotive door interior assembly as defined in claim 3 wherein said pedestal has a key-hole shaped opening in said truncated second end for receiving said shaft to hold said retaining means in detachable engagement with said truncated second end, said pedestal also having a flange protruding from said inner surface to hold said collar against said truncated second end.

5. An automotive door interior assembly as defined in claim 4 wherein said receiving means comprises an aperture through which said spear-shaped member is inserted to attach said trim panel to said inner door panel.

6. An automotive door interior assembly comprising:

an interior door trim panel;

at least one boss extending from the trim panel having a plurality of sections of varying wall thickness for allowing energy absorption through columnar deformation of the boss, with at least one boss comprising at least one conically shaped hollow pedestal having:

a first end attached to the trim panel;

a truncated second end projected toward said inner door panel;

a wall connecting the first end and the second end; and an inner surface on the wall having a groove thereon defining a grooved wall section of reduced thickness and two adjacent non-grooved sections of same thickness as the wall so that the two adjacent non-grooved sections of same thickness as the wall so that the two adjacent non-grooved sections collapse about the grooved wall section of reduced thickness when the pedestal is columnarly loaded along an axis generally perpendicular to a plane defined by the trim panel through the pedestal;

retaining means attached to the truncated second end, the retaining means comprising;

a spear-shaped attachment member;

a shaft extending axially from the spear-shaped attachment member and having a width smaller than the width of the spear-shaped attachment member;

a column member attached to the shaft and having a width wider than the shaft; and an inner door panel having receiving means therein for receiving the retaining means to attach the trim panel to the inner door panel.

* * * * *